US011869257B2

(12) United States Patent
Hu et al.

(10) Patent No.: US 11,869,257 B2
(45) Date of Patent: Jan. 9, 2024

(54) AR-BASED LABELING TOOL FOR 3D OBJECT DETECTION MODEL TRAINING

(71) Applicant: International Business Machines Corporation, Armonk, NY (US)

(72) Inventors: Guoqiang Hu, Shanghai (CN); Sheng Nan Zhu, Shanghai (CN); Yuan Yuan Ding, Shanghai (CN); Hong Bing Zhang, Beijing (CN); Dan Zhang, Beijing (CN); Tian Tian Chai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 17/206,255

(22) Filed: Mar. 19, 2021

(65) Prior Publication Data

US 2022/0300738 A1    Sep. 22, 2022

(51) Int. Cl.
*G06V 10/44*    (2022.01)
*G06V 20/80*    (2022.01)
(Continued)

(52) U.S. Cl.
CPC .............. *G06V 20/80* (2022.01); *G06T 7/12* (2017.01); *G06V 10/44* (2022.01); *G06V 10/82* (2022.01);
(Continued)

(58) Field of Classification Search
CPC ........ G06V 20/80; G06V 10/20; G06V 10/44; G06V 20/56; G06V 10/82; G06V 20/64;
(Continued)

(56) References Cited

U.S. PATENT DOCUMENTS 10,482,674 B1 * 11/2019 Wu .................... G09B 25/00
2019/0087942 A1    3/2019 Ma et al.
(Continued)

FOREIGN PATENT DOCUMENTS

CN    111964606 A    11/2020
WO    2020207177 A1    10/2020

OTHER PUBLICATIONS

He, Tong, and Stefano Soatto. "Mono3d++: Monocular 3d vehicle detection with two-scale 3d hypotheses and task priors." Proceedings of the AAAI Conference on Artificial Intelligence. vol. 33. No. 01. 2019. (Year: 2019).*

(Continued)

*Primary Examiner* — Siamak Harandi
*Assistant Examiner* — Denise G Alfonso
(74) *Attorney, Agent, or Firm* — Scully, Scott, Murphy & Presser, PC; Jared Chaney, Esq.

(57) ABSTRACT

A method for detecting and labeling a target object in a 2D image includes receiving a plurality of 2D images from a visual sensor, manually marking points of the target object on each of the 2D images, generating from the 2D images a 3D world coordinate system of the environment surrounding the target object, mapping each of the marked points on the 2D images to the 3D world coordinate system using a simultaneous localization and mapping (SLAM) engine, automatically generating a 3D bounding box covering all the marked points mapped to the 3D world coordinate system, mapping the 3D bounding box to each of the 2D images, generating a label for the target object on each of the 2D images using a machine learning object detection model, and training the machine learning object detection model based on the generated label for the target object.

25 Claims, 11 Drawing Sheets

(51) Int. Cl.
  *G06T 7/12* (2017.01)
  *G06V 20/56* (2022.01)
  *G06V 10/82* (2022.01)
(52) U.S. Cl.
  CPC .... *G06V 20/56* (2022.01); *G06T 2207/20084* (2013.01); *G06T 2207/30252* (2013.01)

(58) Field of Classification Search
  CPC ............. G06T 7/12; G06T 2207/20084; G06T 2207/30252; G06T 2207/10016; G06T 2207/20081; G06T 2207/20101; G06T 2207/30244; G06T 7/75; G06T 7/73
  See application file for complete search history.

(56) References Cited

U.S. PATENT DOCUMENTS

| | | | |
|---|---|---|---|
| 2019/0147610 A1 | 5/2019 | Frossard et al. | |
| 2020/0082180 A1 | 3/2020 | Wang | |
| 2020/0324781 A1* | 10/2020 | Hayakawa | G06V 20/56 |
| 2020/0376675 A1 | 12/2020 | Bai et al. | |

OTHER PUBLICATIONS

Fang, Jiaojiao, Lingtao Zhou, and Guizhong Liu. "3d bounding box estimation for autonomous vehicles by cascaded geometric constraints and depurated 2d detections using 3d results." arXiv preprint arXiv:1909.01867 (2019). (Year: 2019).*

Ahmadyan et al., "Announcing the Objectron Dataset", Blog, Google AI, Nov. 9, 2020, pp. 1-4.

Fang et al, "3D Bounding Box Estimation for Autonomous Vehicles by Cascaded Geometric Constraints and Depurated 2D Detections Using 3D Results", Computer Science, Computer Vision and Pattern Recognition, arXiv:1909.01867v1, Sep. 1, 2019, pp. 1-11.

"MediaPipe Objectron", Solutions/Objectron (3D object Detection), pp. 1-8, downloaded on Feb. 12, 2021, https://google.github.io/mediapipe/solutions/objectron.html.

He et al., "Dominant Symmetry Plane Detection for Point-Based 3D Models", Hindawi, Advances in Multimedia, Oct. 28, 2020, pp. 1-8, vol. 2020, Article ID 8861367.

Patrick Langechaun Liu, "Lifting 2D object detection to 3D in autonomous driving", Towards data science, Nov. 3, 2019, pp. 1-13.

Nabil Madali, "3D Bounding Box Estimation Using Deep Learning and Geometry", Sep. 18, 2020, pp. 1-11.

Sommer et al., "From Planes to Corners: Multi-Purpose Primitive Detection in Unorganized 3D Point Clouds", IEEE Robotics and Automation Letters, Jan. 2020, pp. 1-8.

Scalabel, "A scalable open-source web annotation tool", Discover, Dec. 31, 2019, pp. 1-4.

Jair Ribeiro, "Google Objectron—A giant leap for the 3D object detection", Nov. 23, 2020, pp. 1-16.

* cited by examiner

AR-BASED LABELING TOOL FOR 3D OBJECT DETECTION MODEL TRAINING

BACKGROUND OF THE INVENTION

This disclosure is directed to computers, and computer applications, and more particularly to computer-implemented methods and systems for an augmented reality (AR) based labeling tool for 3D object detection model training.

3D object detection is gaining increasing attention for numerous applications for consumers and in industry. 3D object detection is critical for such applications as autonomous driving, object manipulation by robots and excellence of customer web based experience such as for on-line shopping. Detecting all objects in a traffic environment, such as cars, buses, pedestrians, and bicycles, is crucial for building an autonomous driving system.

In computer based object detection, vision data is processed to generate three-dimensional (3D) bounding boxes for objects captured by the vision data. A 3D bounding box of an object provides a full multi-dimensional representation of the object. 3D bounding boxes can be utilized for various aspects of control of the robot. For example, in manipulating an object, the robot can determine how to manipulate the object based on a generated 3D bounding box for the object.

For example, in the control of an autonomous vehicle, the identification of objects surrounding vehicle is essential for operating the vehicle and advanced driver-assistance systems enabled vehicles. For example, the generation of a 3D bounding box provides position and orientation of surrounding vehicles which are critical information for decision making and path planning for operating autonomous vehicles and advanced driver-assistance systems enabled vehicles.

Given an input image, the goal of 3D object detection is to output a category label and the location using a cuboid (3D) bounding box of all objects of interest. However, while deep learning-based 2D object detection models have been successfully applied to a variety of computer vision tasks, there is a much higher labeling cost for 3D object detection than that for 2D detection. For example, the width and height of a 2D bounding box is easy to be determined manually by fitting the box into tangent lines of the objects' edges. However, in the 3D scenario, width, height and length, as well as pitch, roll and yaw must be determined and tangent planes of a 3D object are difficult to be accurately determined visually in a single view.

In one prior art system, known as the MediaPipe Objectron, a mobile real-time object detection system includes a labeling tool for manually drawing and annotating a 3D bounding box. Another prior art system, know as SCAlable, is an open-source web annotation tool based on a dense point cloud model, in which 2D bounding boxes are manually drawn.

However, various 3D bounding box generation techniques can lack accuracy and/or lack robustness. Such lack of accuracy and/or robustness can result in failure of a robotic task being performed on the basis of the 3D bounding box. For instance, in generating a 3D bounding box for an object, a 3D point cloud that is determined to correspond to the object can be utilized. The 3D point cloud is generated based on vision data from one or more vision components is a very complex and expensive system to implement.

All the known labeling tools for 3D object detection apply manual drawing/fitting of 2D or 3D bounding boxes, which is cumbersome and prone to inaccuracies. Failure to detect an object may lead to malfunction of the motion planning module of an autonomous driving car or for a robotic control system, thus possibly resulting in a catastrophic accident. As such, accurate object detection is an important operational and safety issue.

SUMMARY OF THE INVENTION

In one embodiment, a computer implemented method for detecting and labeling an object in a 2D image includes receiving a plurality of 2D images from a visual sensor, where each image of the plurality of 2D images includes an image of a target object in an surrounding environment, manually marking points of the target object on each image of the plurality of 2D images, generating from the plurality of 2D images a 3D world coordinate system of the environment surrounding the target object, mapping each of the marked points on the plurality of 2D images to the 3D world coordinate system using a simultaneous localization and mapping (SLAM) engine, automatically generating a 3D bounding box covering all the marked points mapped to the 3D world coordinate system, mapping the 3D bounding box to each of the plurality of 2D images, generating a label for the target object on each of the plurality of 2D images using a machine learning object detection model, and training the machine learning object detection model based on the generated label for the target object.

In one embodiment, the method may include determining a ground plane in the 3D world coordinate system on which the 3D bounding box is to be placed when mapping the 3D bounding box to each of the plurality of 2D images. In one embodiment, the method may include marking two points in each of the plurality of 2D images that define a main axis of the target object and using the main axis when generating a 3D bounding box. In one embodiment, the method may include estimating occluded points in at least one of the plurality of 2D images by defining lines starting from visible marked points. In one embodiment, defining lines starting from visible marked points may include defining a first line between two visible marked points, defining a second line between a visible point and an occluded point and forcing the second line to be parallel to the first line.

A computer system that includes one or more processors operable to perform one or more methods described herein also may be provided.

A computer readable storage medium storing a program of instructions executable by a machine to perform one or more methods described herein also may be provided.

An augmented reality (AR) labeling tool including a processor, a memory and a computer-readable storage medium having an AR application including a main controller, a SLAM engine, and image/point processing engine and a scene orientation engine may also be provided. In one embodiment, the AR application has program instructions where execution of the program instructions using a computer causes the computer to perform one or more methods for detecting and labeling an object in 2D image, may also be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

In one embodiment, an augmented-reality (AR) based 3D object labeling tool that does not rely on a dense point cloud or a fine 3D model and does not require manual drawing/fitting of a 3D bounding box is disclosed. The method and system disclosed herein automatically defines a 3D bounding box by specifying key-points or lines over 2D images backed by an AR SLAM engine which improves the accuracy for detecting 3D objects. In one embodiment, the system and method defines key points of the target object by incremental key point labeling and using the AR SLAM Engine to map the 3D key points in a 3D world coordinate system. In one embodiment, key points of the target objects are manually marked on multiple 2D images and the AR SLAM engine maps each of the key points to the 3D world coordinate system. In one embodiment, plane detection is used to determine the base plane over or under which the 3D object is placed. In one embodiment, essential occluded key points are estimated based on axis lines defined from known key points of the 3D object. A minimal 3D bounding box is automatically fit based on the visible and occluded key points, the base plane, and the axis line(s) in the 3D world coordinate system.

Figure 1:
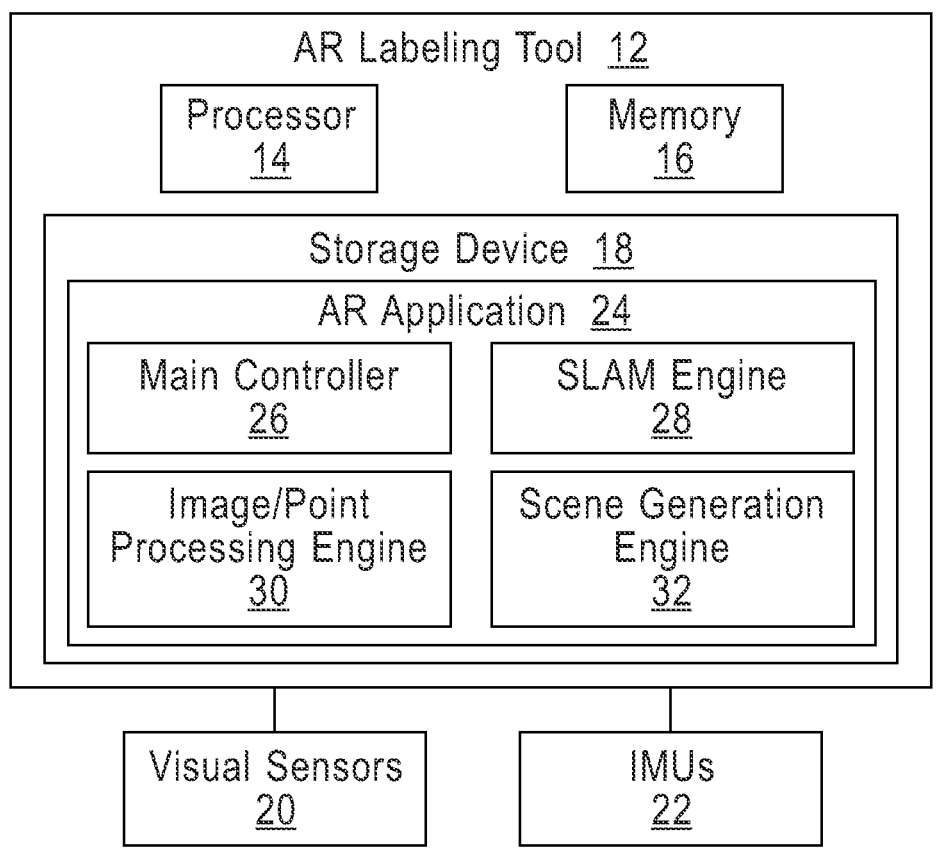
FIG. 1 is a block diagram of one embodiment of the system disclosed in this specification.
Figure 10:
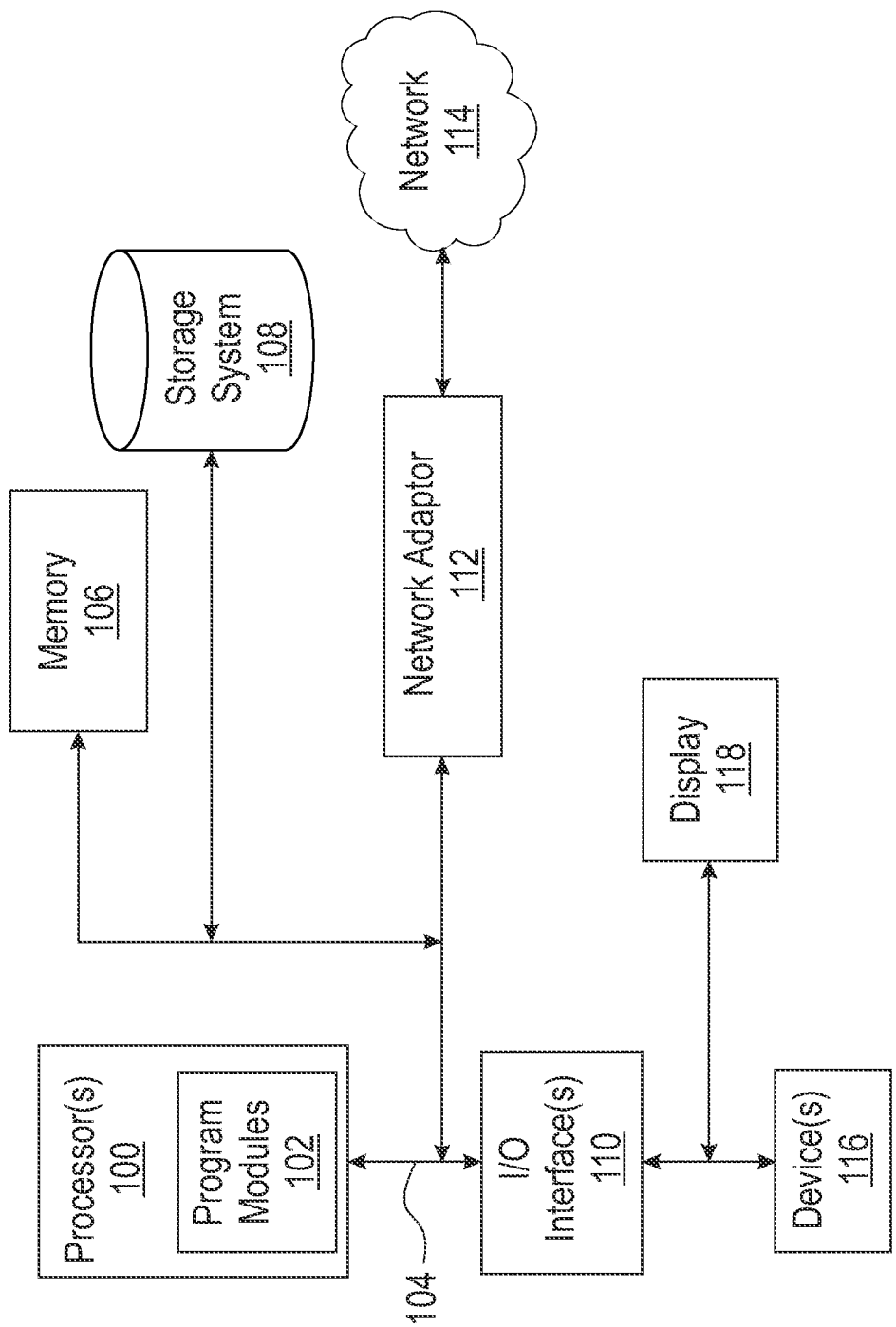
FIG. 10 is a block diagram of an exemplary computing system suitable for implementation of the embodiments of the invention disclosed in this specification.

FIG. 1 is a block diagram of one embodiment of a 3D object detection system 10. In one embodiment, the 3D object detection system 10 includes an augmented reality (AR) labeling tool 12 for object detection model training. In one embodiment, the 3D object detection system 10 may be a mobile device, a tablet, a computer, a wearable device, a specialized computer, a server computer, a cluster, or a cloud computer. As shown in FIG. 1, the AR labeling tool 12 may include, without being limited to, a processor 14, a memory 16, and a storage device 18. In certain embodiments, the AR labeling tool 12 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. One example of a computer processing system for implementing the AR labeling tool 12 is shown in FIG. 10 and is described later in this disclosure. In one embodiment, the 3D object detection system 10 includes one or more visual sensors 20 and optionally one or more inertial measurement units (IMUs) 22. The visual sensors 20 and the IMUs 22 are in communication with the AR labeling tool 12 and under control of the AR labeling tool 12.

In one embodiment, the storage device 18 includes an augmented reality application 24. In one embodiment, the augmented reality application 24 includes a main controller 26, an AR SLAM engine 28, an image/point processing engine 30 and a scene generation engine 32. The AR SLAM engine 28 uses images received from the visual sensors 20, such as cameras, to construct and update a map for the environment while keeping track of the cameras' pose with regard to the environment. The image/point processing engine 30 is configured to obtain features from images and use these data for subsequent operations. The scene generation engine 32 is configured to process the acquired images as well as point sets acquired by the AR SLAM engine 28 to understand the contents and 3D geometry of the scene.

The main controller 26 is configured to receive images captured by the visual sensors 20 and communicate with the AR SLAM engine 28, the image/point processing engine 30 and the scene generation engine 32. The main controller 26 inputs related data to those engines, instructs the engines to perform their respective functions, and receives or redirects the data outputted from those engines. In certain embodiments, the main controller 26 may not be necessary and the engines may communicate with each other directly without going through the main controller 26.

The AR SLAM engine 28 is configured to, upon receiving captured images directly from the visual sensors 20 or via the main controller 26, calculate poses of the visual sensors 20 and construct a 3D map of the environment. With the continuous capturing of new 2D images by the visual sensors 20, the 3D map is also updated continuously by the AR SLAM engine 28. In certain embodiments, the poses and the 3D map are accessible by the main controller 26 and/or other related engines, such as the image/point processing engine 30 and the scene generation engine 32. The poses of the camera may be represented as a three-degree translation and a three-degree rotation, and the 3D map may be a map of feature points. Each feature point has a specific feature descriptor based on the feature of the corresponding feature point in the 2D images.

Figure 2:
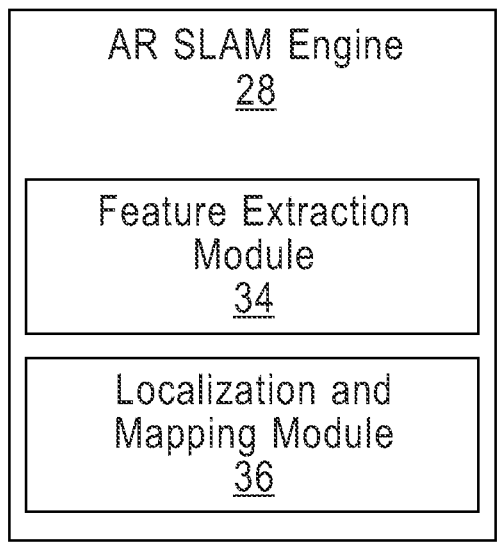
FIG. 2 is a block diagram of one embodiment of the system disclosed in this specification.

As shown in FIG. 2, the AR SLAM engine 28 includes a feature extraction module 34, and a localization and mapping module 36. In certain embodiments, the feature extraction module 34 is configured to detect features and extract feature points from the captured images, and calculate feature descriptors for the feature points. In one embodiment, the feature extraction module 34 manually marks critical points of the target objects on multiple 2D images and the localization and mapping module 36 maps each of the critical points to a uniform 3D world coordinate system. The localization and mapping module 36 determines the poses of the cameras and constructs the 3D map of the environment using the extracted feature points.

In certain embodiments, the feature detection includes detection of corners from the images. Corners are regions with a high gradient variation and are easily recognizable in different images and are used to track the 2D images. In certain embodiments, the AR SLAM engine 28 may be provided by ARKit, ARCore, or other customized AR SLAM engines.

The image/point processing engine 30 in one embodiment is configured to extract features from 2D images, and detect and fit planes. In one embodiment, plane detection is used to determine the "base plane" which is a ground plane over or under which the 3D object is placed or fixed by the AR SLAM engine 28.

The 2D images may be received directly from the visual sensors 20 or via the main controller 26, or in certain embodiments, the 2D images used by the image/point processing engine 30 are the same 2D images used by the AR SLAM engine 28. In certain embodiments, the point data and camera poses are obtained from the AR SLAM engine 28. The 3D map in SLAM, after being updated by the image/point processing engine 30 with plane information, is a 3D plane map, where plane information is added as associated plane labels of the feature points. The 3D plane map is continuously updated by the AR SLAM engine 28.

Figure 3:
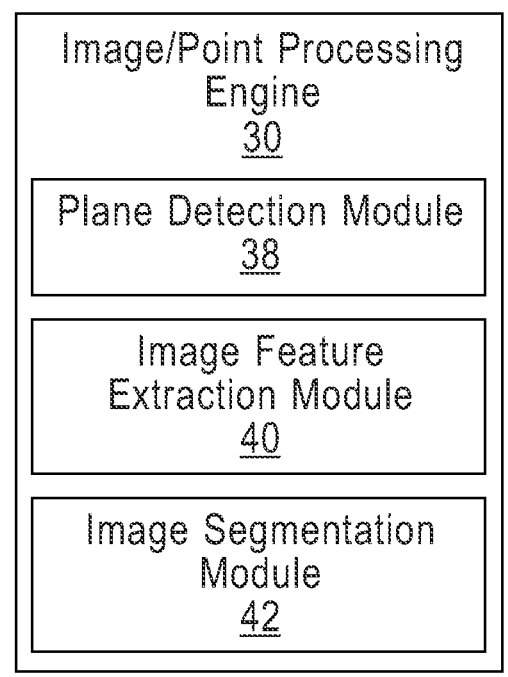
FIG. 3 is a block diagram of one embodiment of the system disclosed in this specification.

As shown in FIG. 3, in one embodiment, the image/point processing engine 30 includes a plane detection module 38, an image feature extraction module 40, and an image segmentation module 42. The plane detection module 38 adds plane information to the 3D map, while the image feature extraction module 40, and the image segmentation module 42 obtain features, as well as segmentation information from the 2D images.

The plane detection module 38 is configured to fit both horizontal and vertical planes, and optionally planes forming variant angles with the horizontal and vertical planes. Specifically, the plane detection module 38 detects multiple 3D points that belong to a plane such as a vertical plane, and determines the boundaries of the vertical plane based on the distribution of those 3D feature points. The plane detection module 38 then labels the vertical plane having boundaries in the 3D map. In certain embodiments, the plane detection module 38 may use parameterized representation to define the planes. In one example, the plane detection module 38 uses a center point, length and width of a plane, and a normal direction to define the plane. In one example, the plane detection module 38 uses one point on the plane and a plane orientation to define the plane. In certain embodiments, the plane detection module 38 may use a non-parameterized representation of the plane by labeling a set of feature points as belonging to that plane, so as to define the plane. Those labels are now part of the 3D map. The 3D map from the AR SLAM engine 28, after incorporating information of horizontal, vertical planes and possible planes along other directions, is defined as s 3D plane map. This 3D plane map is continuously updated by both the AR SLAM engine 28 and the image/point processing engine 30.

In certain embodiments, objects in each of the 2D images are respectively surrounded by bounding boxes, and labeled with the category or name of the object, such as a vehicle, a table or a chair. In one embodiment, the image segmentation module 42 automatically fits a minimal 3D bounding box based on the critical points (visible or occluded), the base plane, and the axis line(s) in the 3D world coordinate, output by the AR SLAM engine 28 and the image/point processing engine 30.

Figure 4A:
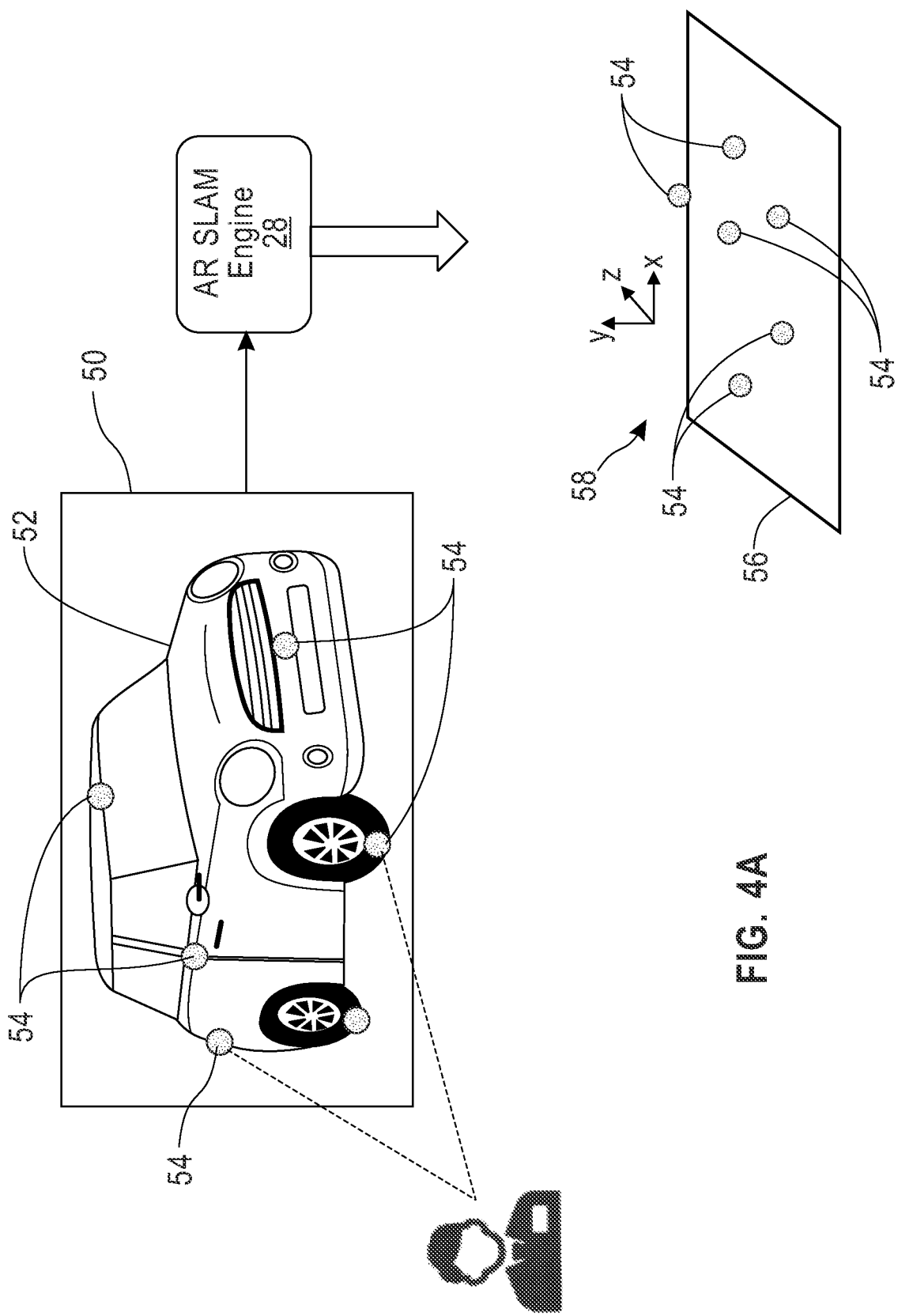
FIG. 4A is a schematic diagram one embodiment of the method disclosed in this specification.
Figure 4B:
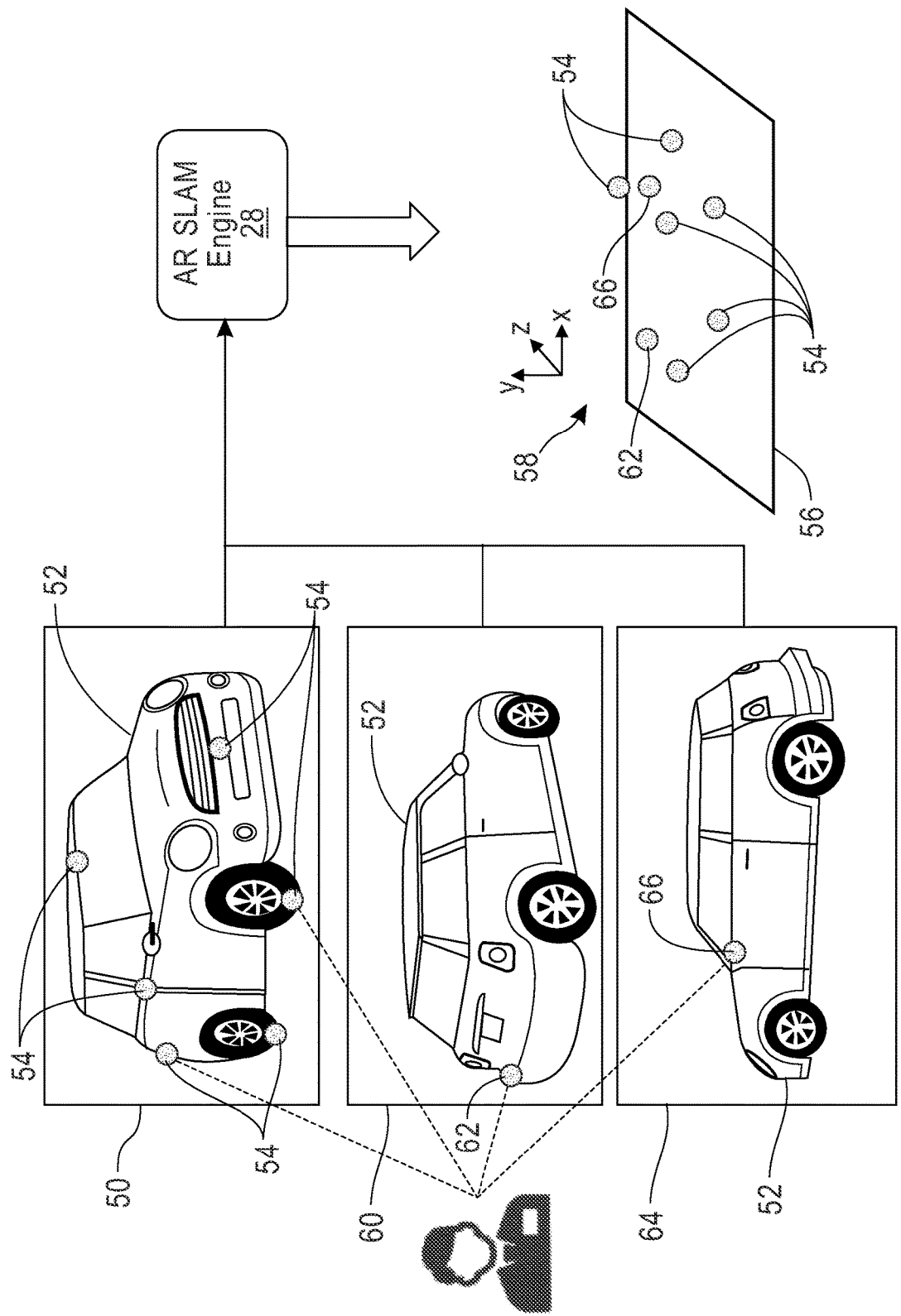
FIG. 4B is a schematic diagram one embodiment of the method disclosed in this specification.

FIGS. 4A-4D schematically depicts the steps of manually marking critical points of the target objects on multiple 2D images and using the AR SLAM engine 28 to map each of the critical points to a uniform 3D world coordinate system. FIG. 4A represents a 2D image 50 showing vehicle 52 in a front perspective view. The key points 54 on the vehicle image 52 are manually marked incrementally using the image feature extraction module 40. The ground plane 56 of the 3D coordinate system 58 is determined by the plane detection module 38. The AR SLAM engine 28 maps the key points 54 to 3D coordinate system 58. FIG. 4B represents an additional 2D image 60 showing the vehicle 52 in a rear perspective view. An additional key point 62 is manually marked using the image feature extraction module 40. FIG. 4B represents an additional 2D image 64 showing the vehicle 52 in a side view. An additional key point 66 is manually marked using the image feature extraction module 40. The AR SLAM engine 28 maps the additional key points 62 and 66 to 3D coordinate system 58.

Figure 4C:
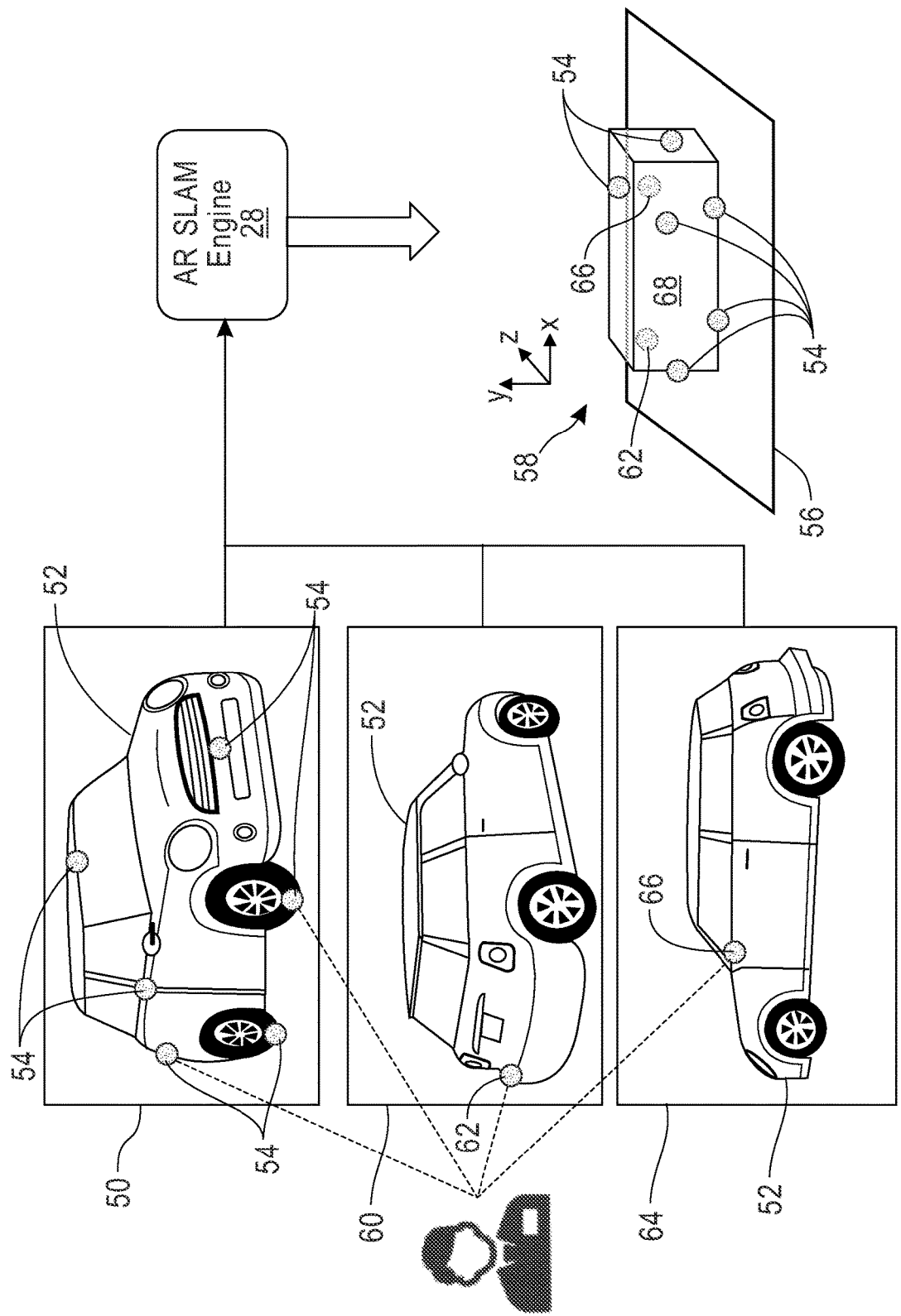
FIG. 4C is a schematic diagram one embodiment of the method disclosed in this specification.

As shown in FIG. 4C, the localization and mapping module 36 of the AR SLAM engine 28 automatically generates a minimal 3D bounding box 68 covering all the key points 54, 62 and 66 and sitting on the ground plane 56.

Figure 4D:
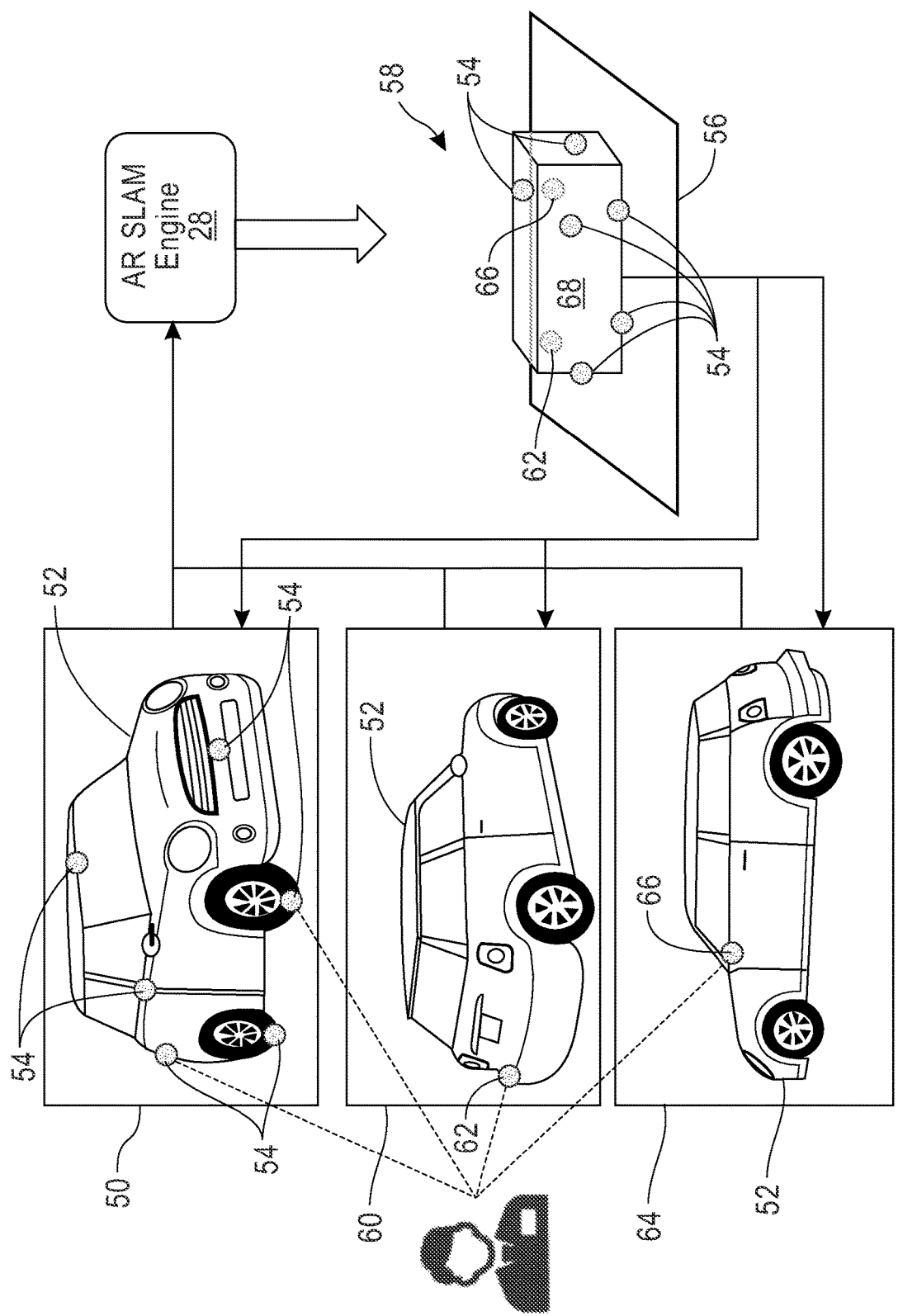
FIG. 4D is a schematic diagram one embodiment of the method disclosed in this specification.

As shown in FIG. 4D, the localization and mapping module 36 of the AR SLAM engine 28 maps the 3D bounding box 68 back to each 2D image 50, 60 and 64 to make the label of the 3D bounding box 68 projection. Based on the determined cuboid formed by the 3D bounding box in the 3D world coordinate system together with the observer coordinate and view angles (also obtainable from the AR SLAM engine 28) of each 2D image, the 3D bounding box is projected to each 2D image.

The image feature extraction module 40 is configured to extract features other than corners from the 2D images. In certain embodiments, the image feature extraction module 40 is configured to extract more features from the images than the feature extraction module 34. The feature extraction module 34 is configured to detect features such as corners or other limited number of features from the image, so as to track the feature in the images easily to perform SLAM. In contrast, the image feature extraction module 40 is configured to extract more complex features for scene recognition, such as edges, blob, ridge, lines, circles, planes, etc.

In one embodiment, image feature extraction module 40 estimates essential occluded key points by defining lines starting from known key points. In one embodiment, image feature extraction module 40 defines one or more axis lines for the target 3D object. For example, in one embodiment, image feature extraction module 40 defines a line indicating a main axis direction of a target object by marking two points in the 2D images.

Figure 5:
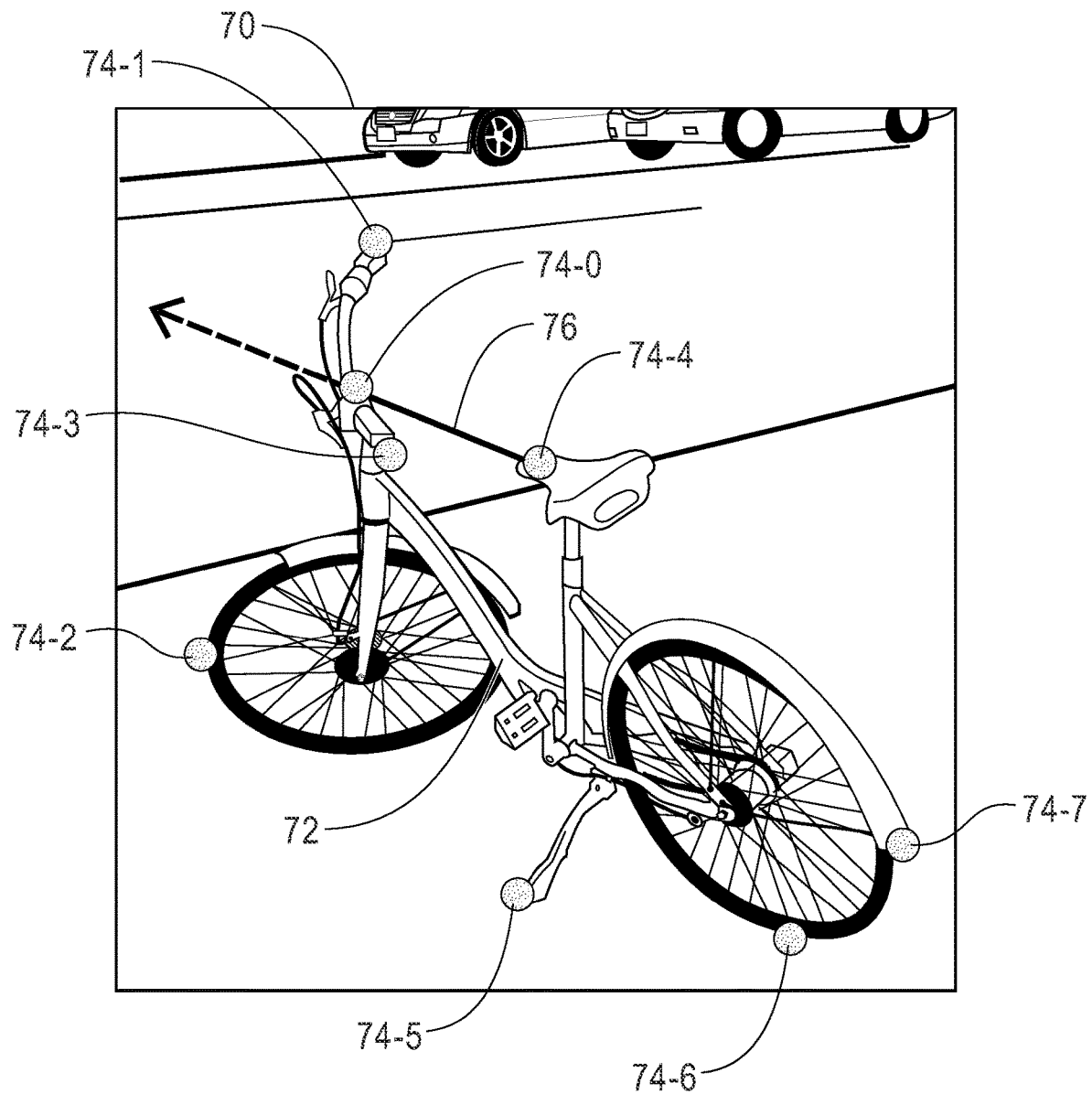
FIG. 5 is a drawing depicting an image showing marking of points of an object according to one embodiment of the method disclosed in this specification.
Figure 6B:
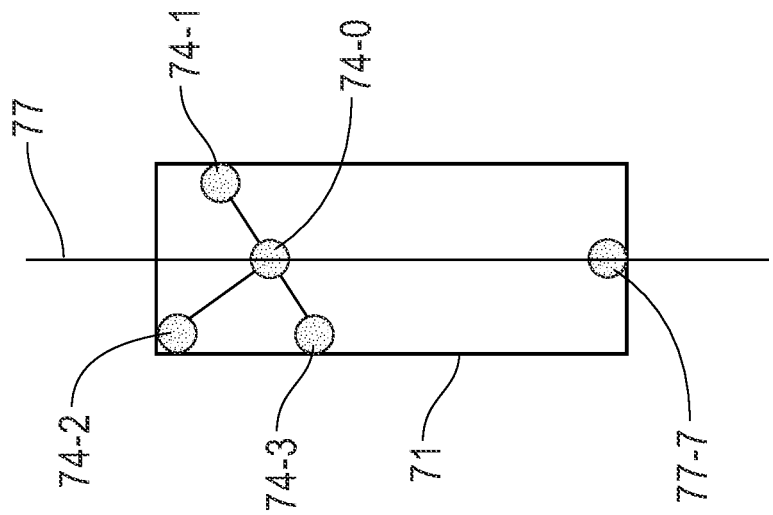
FIGS. 6A and 6B are representations of a top view of a bounding box according to one embodiment of the method disclosed in this specification.
Figure 6A:
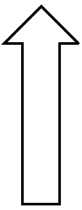
Figure 6A:
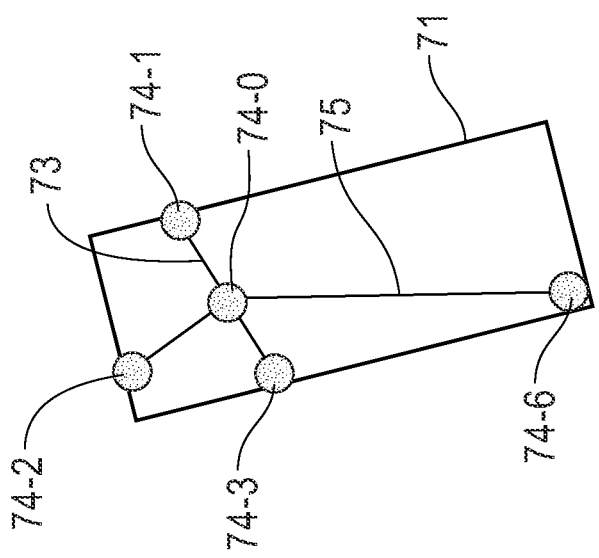

In one example, FIG. 5 is a representation of a 2D image 70 of a bicycle 72 with the key points 74-0 through 74-7 manually marked incrementally using the image feature extraction module 40. In one embodiment, a line 76 forming a main axis is defined by manually connecting two of the key points 74-1 and 74-3. In one embodiment, an additional constraint of the line connecting the two points defining the axis is that the line should be parallel to the plane. This will automatically align the axis line to be horizontal. The axis helps better generate the 3D bounding box in the 3D world coordinate. For example, FIG. 6A is a top view of a possible bound box 71 of the bicycle 72 in FIG. 5. Key points 74-1 and 74-3 are the ends of the two handle bars and are connected by a line 73. Key point 74-2 is on the front tire and key point 74-6 is on the rear tire. Because the line 75 connecting points 74-2 and 74-6 was drawn without the constraint of defining a main axis parallel to the plane, the size and pose angle of the bounding box 71 is incorrect. On the other hand, FIG. 6B is a top view of the bounding box 71 which was drawn with the constraint that a main axis 77 be defined that is parallel to the plane. As a result, the main axis 77 goes through point 77-7 and the size and pose angle of the bounding box 71 is correct.

Figure 7:
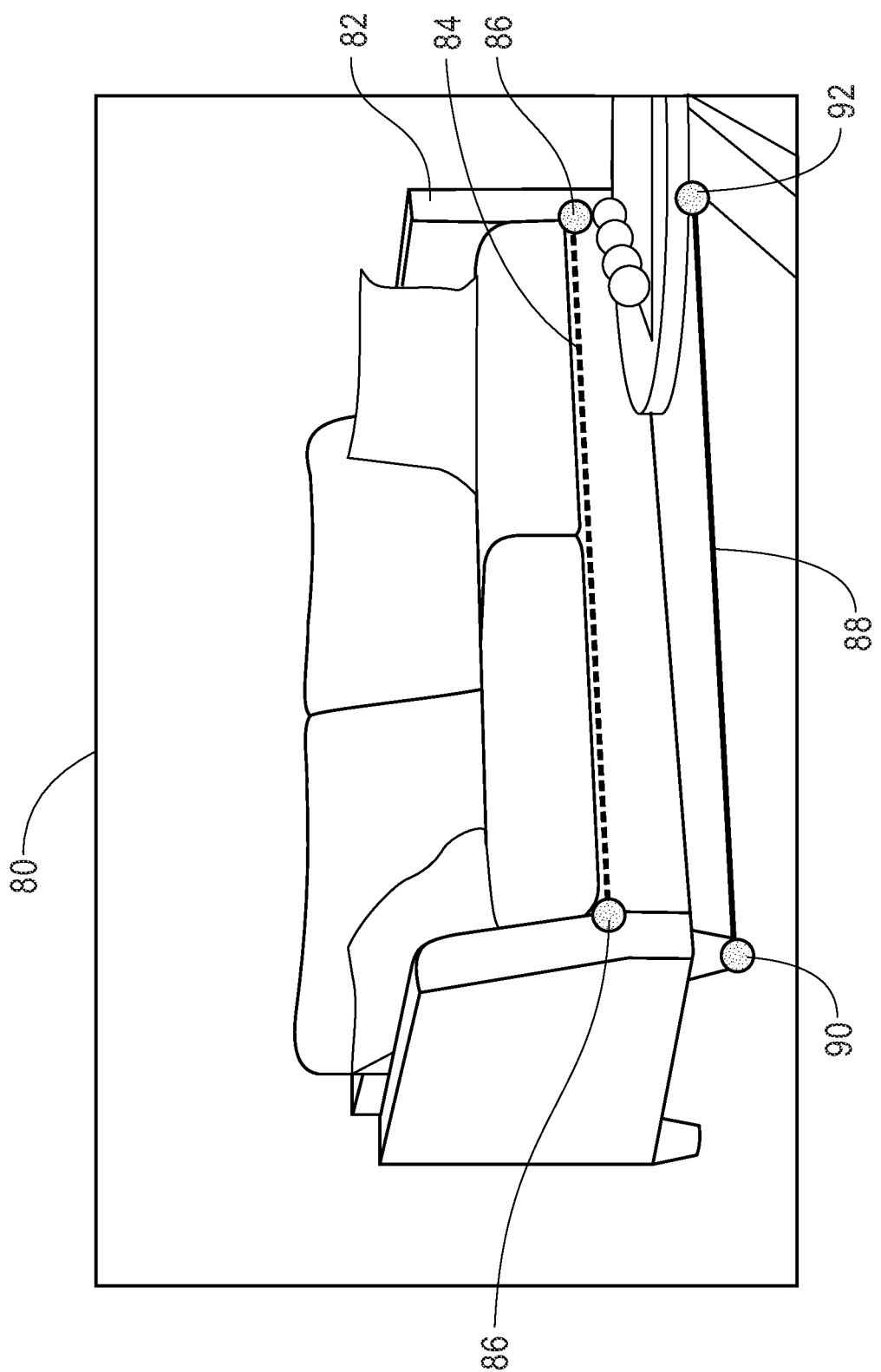
FIG. 7 is a drawing of an image showing marking of points of an object according to one embodiment of the method disclosed in this specification.

In the case of FIG. 5, both points defining the line 75 are on visible surfaces of the target object in the 2D images. The lines defined in this way are denoted 'Type-A' lines. In one embodiment, as shown in FIG. 7, a 2D image 80 of a couch 82, the image feature extraction module 40 defines a line 84 by marking two points 86 defining the main axis. The main axis line 84 is a reference Type-A line drawn between both ends on the target object 82 using the image feature extraction module 40. The image feature extraction module 40 then defines a line 88 by marking two points and drawing the line 88 from the visible key point 90 to the estimated 2D position of an occluded key point 92. The line 88 is forced parallel with a defined reference Type-A line 84. The line 88 points to one point 90 on a visible surface of the target object 82 in the image 80 and the other end of line 88 points to the occluded critical point 92 of the target object 82. The line 88 defined in this way is denoted a 'Type-B' line. In one embodiment, image feature extraction module 40 estimates the 3D coordinate of occluded critical point 92 according to the corresponding definition of the Type-B line 88 together with the reference Type-A line 84.

Figure 8:
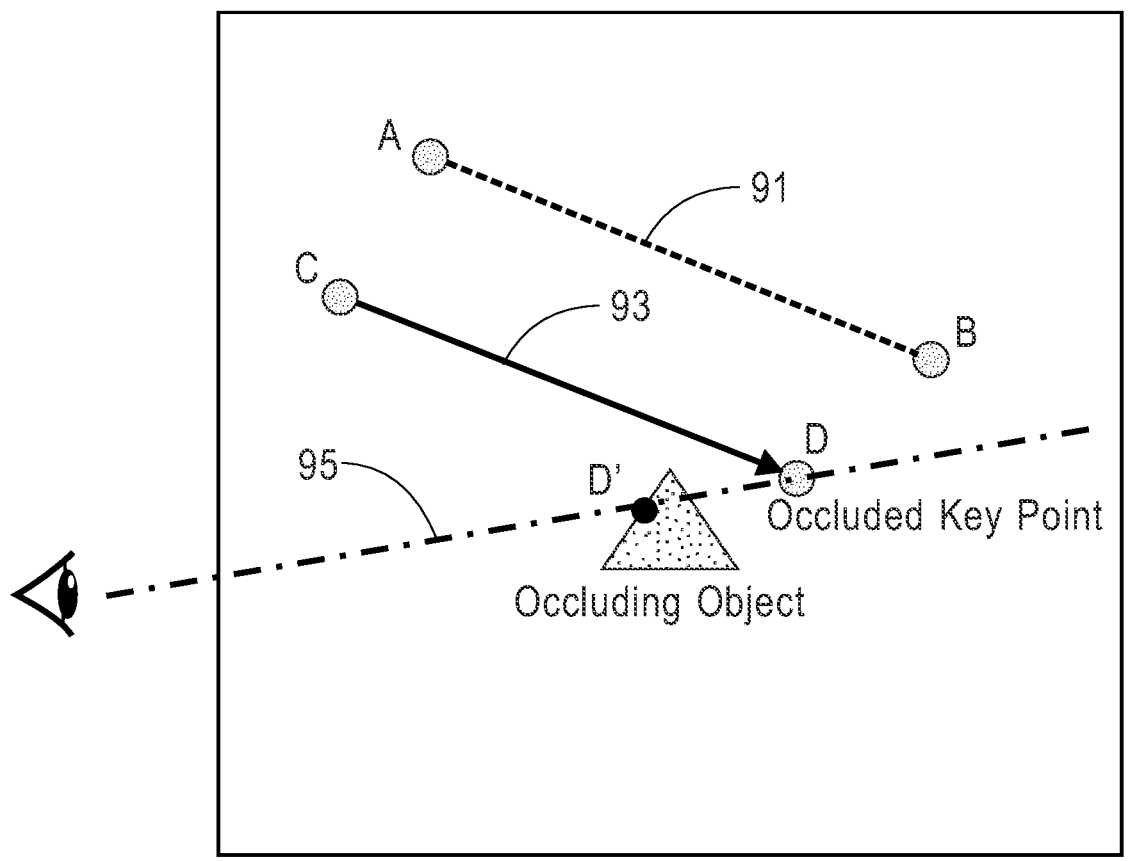
FIG. 8 is a schematic drawing representing one method for marking an occluded point on an image according to one embodiment of the method disclosed in this specification.

For example, as shown in FIG. 8, with AR technology, the 3D coordinates of the two end points A/B of the reference type-A line 91 can be obtained. The 3D coordinate of the visible end C of the type-B line 93 is available in the same way. The line of sight 95 can be also obtained by the point D'. The occluded key point D can then be uniquely determined by the crossing of the light of sight 95 and a line 93 that is parallel to AB and starts from C.

The occluded points are mapped to a 3D coordinate with the same procedure used by the feature extraction module 34 by using the localization and mapping module 36 to map each of the occluded points to a uniform 3D world coordinate system.

The outputs of the SLAM engine 28 are the key points, the ground plane and axis. Having the set of key points in a 3D coordinate system and a detected ground plane, the AR SLAM engine 28 automatically maps into the 3D world coordinate system a cuboid (the 3D bounding box) of minimal volume that contains all the key points and has one of its 6 surfaces on the ground plane. This is a 3D geometric fitting problem that can be modeled as an optimization problem with constraints by the scene orientation engine 32. If necessary, the main axis of the cuboid can be included as a further constraint for the problem.

In certain embodiments, the image feature extraction module 40 detects and extracts features learned by machine learning, especially deep learning methods. The detected features in the 2D images can then be used by the scene generation engine 32. When the corners and other features are detected or extracted from the 2D images, the image segmentation module 42 segments the images based on the detected features. In certain embodiments, the 2D features extracted by the image feature extraction module 40 can also be re-projected back to the 3D map.

In certain embodiments, the scene generation engine 32 is configured to, upon receiving the features and segmentations from the 2D images, detect and recognize objects in the 2D images, and project the recognized objects in the 2D images to the 3D plane map, to update the 3D plane map to form a 3D scene map. The obtained 3D scene map is still part of the SLAM, and is continuously updated by the AR SLAM engine 28 with updated feature points from new 2D images, updated by the image/point processing engine 30 with updated plane information, and updated by the scene generation engine 32 with object information.

In certain embodiments, the scene generation engine 32 includes a training module, an inference engine, and a 2D-to-3D projection module. The training module is configured to train different machine learning models using a labeled image dataset and optionally an unlabeled image dataset. After running the models through the inference engine, the 2D-3D projection module is configured to project the generated scene obtained from the 2D images to the 3D plane map, so as to update the 3D plane map to form the 3D scene map.

In one embodiment, training module includes an image recognition model, an image segmentation model, an image classification model, and an image depth model. In certain embodiments, the labeled image dataset includes a plurality of 2D images. In certain embodiments, each of the image recognition model, the image segmentation model, the image classification model, and the image depth model are machine learning mechanisms or neural networks such as region-based convolutional neural networks (R-CNNs). After training, the image recognition module is able to determine the position and label of the objects and recognize the objects, a vehicle, a human etc. from an input image. The image segmentation module is able to segment the input image into segments so as to locate objects and boundaries of the objects. The image classification module is able to classify the input image to different categories. The image depth module 1268 is configured to estimate depth of the objects. The machine learning mechanism can be trained offline, and then be used based on the purpose of the AR application 24.

The inference engine may be part of the AR application 24 installed on the AR labeling tool 12, or an independent cloud module that is accessible by the AR labeling tool 12. For example, the trained models and the inference engine may be located at a server computer, and when a plurality of 2D images are uploaded from the AR labeling tool 12 to the server computer as input, the inference engine uses those trained models to analyze the inputted 2D images to generate scene information, such as the location, the boundary and the name of the objects in the images, and sends the information back to the AR labeling tool 12, such that the AR application 24 in the AR labeling tool 12 can use the information to update the 3D map.

The inference engine is configured to perform one or more of the models using 2D images and image features. The 2D images may be inputted directly from the AR SLAM engine 28, from the image/point processing engine 30, directly from the visual sensor 150, or via the main controller 26, and the image features are inputted directly from the image/point processing engine 30 or via the main controller 26. In certain embodiments, both the 2D images and the image features are directly inputted from the image/point processing engine 30. In certain embodiments, the AR SLAM engine 28, the image/point processing engine 30 and the scene generation engine 32 use the same set of 2D images.

The 2D-to-3D projection module is configured to, after obtaining categories of the scene, locations and bounding boxes of the objects, and labels of the objects in the 2D images by the inference engine, project those features to the 3D plane map, so as to update the 3D plane map to the 3D scene map. During SLAM, the correspondence between the 2D feature points in the 2D images and the 3D feature points in the 3D map have already been established. When the inference engine determines that a set of 2D feature points in the 2D images belongs to an object, the set of 2D feature points are labeled with the corresponding object. Subsequently, the object label of the 2D feature points is projected to the corresponding 3D feature points, such that the set of 3D feature points also has the label of the object.

Figure 9:
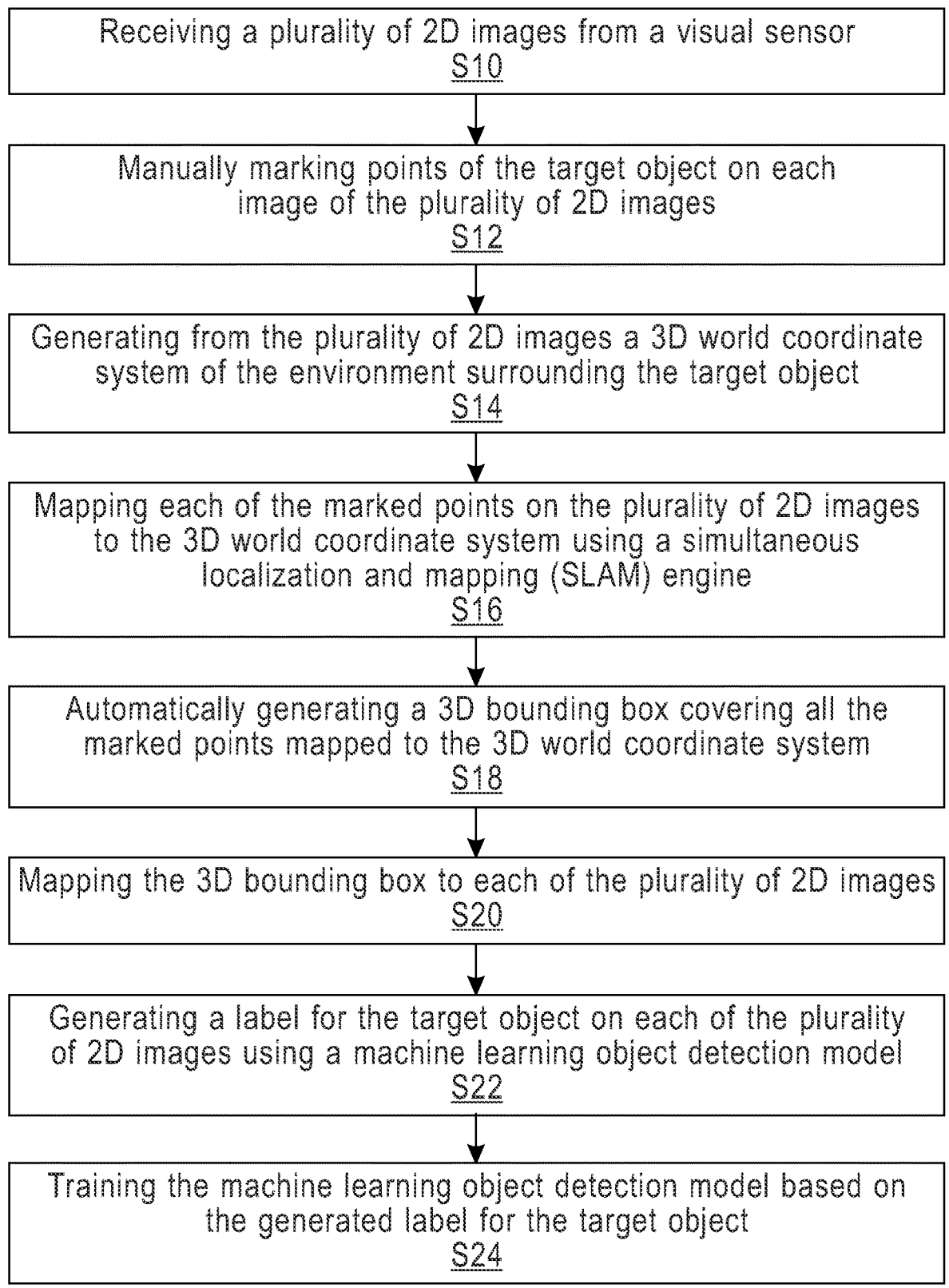
FIG. 9 is a flow diagram on one embodiment of the method disclosed in this specification.

FIG. 9 is a flow diagram of one computer implemented method for detecting and labeling an object in 2D image. The method includes step S10 of receiving a plurality of 2D images from a visual sensor. Each image of the plurality of 2D images includes an image of a target object in an surrounding environment. Step S12 includes manually marking points of the target object on each image of the plurality of 2D images. Step S14 includes generating from the plurality of 2D images a 3D world coordinate system of the environment surrounding the target object. Step S16 includes mapping each of the marked points on the plurality of 2D images to the 3D world coordinate system using a simultaneous localization and mapping (SLAM) engine. Step S18 includes automatically generating a 3D bounding box covering all the marked points mapped to the 3D world coordinate system. Step S20 includes mapping the 3D bounding box to each of the plurality of 2D images. Step S22 includes generating a label for the target object on each of the plurality of 2D images using a machine learning object detection model. Step S24 includes training the machine learning object detection model based on the generated label for the target object.

In one embodiment, step S20 may include determining a ground plane in the 3D world coordinate system on which the 3D bounding box is to be placed when mapping the 3D bounding box to each of the plurality of 2D images. In one embodiment, step S18 may include marking two points in each of the plurality of 2D images that define a main axis of the target object and using the main axis when generating a 3D bounding box. In one embodiment, step S12 may include estimating occluded points in at least one of the plurality of 2D images by defining lines starting from visible marked points. In one embodiment, defining lines starting from visible marked points includes defining a first line between two visible marked points, defining a second line between a visible point and an occluded point and forcing the second line to be parallel to the first line.

FIG. 10 illustrates a schematic of an example computer or processing system that may implement the method and system of an AR labeling tool in one embodiment of the present disclosure. For example, the processor 14 may be implemented by processors 100, memory 16 may be implemented by memory 106 and the AR application 18 may be implemented by program module 102. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to:

microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for detecting and labeling an object in a 2D image comprising:
   receiving a plurality of 2D images from a visual sensor, each image of the plurality of 2D images includes an image of a target object in an surrounding environment;
   detecting features and extracting feature points from the plurality of 2D images;
   manually marking visible feature points of the target object on each image of the plurality of 2D images;
   estimating occluded feature points of the target object in at least one of the plurality of 2D images by defining axis lines starting from visible marked points;
   generating from the plurality of 2D images a 3D world coordinate system of the environment surrounding the target object;
   mapping each of the marked feature points on the plurality of 2D images to the 3D world coordinate system;
   generating a 3D map of the surrounding environment using the extracted feature points;
   automatically generating a 3D bounding box for the target object covering all the marked points mapped to the 3D world coordinate system;
   determining a ground plane of the 3D world coordinate system;
   automatically fitting, in the 3D world coordinate system, the 3D bounding box for the target object in each of the plurality of 2D images based on the visible and estimated occluded points, the axis lines and the ground plane;
   mapping the 3D bounding box back to the plurality of 2D images; and
   generating a label for the target object surrounded by the 3D bounding box on each of the plurality of 2D images using a machine learning object detection model and projecting the label to corresponding feature points of the target object in the 3D map of the surrounding environment.

2. The computer implemented method of claim 1, further comprising fitting the 3D bounding box for each of the plurality of 2D images on the ground plane in the 3D world coordinate system.

3. The computer implemented method of claim 1, further comprising marking two points in each of the plurality of 2D images that define a main axis of the target object and using the main axis when generating the 3D bounding box.

4. The computer implemented method of claim 1, wherein defining axis lines starting from visible marked points includes defining a first line between two visible marked points, defining a second line between a visible point and an occluded point.

5. The computer implemented method of claim 4, further including forcing the second line to be parallel to the first line.

6. The computer implemented method of claim 1, further comprising training the machine learning object detection model based on the generated label for the target object.

7. The computer implemented method of claim 6, wherein training the machine learning object detection model includes determining correspondence between 2D feature points in the plurality of 2D images and 3D feature points in the 3D map, determining that a set of 2D feature points in the plurality of 2D images belongs to the target object, labeling the set of 2D feature points with the corresponding object and projecting the object label of the 2D feature points to the corresponding set of 3D feature points.

8. A computer system for detecting and labeling an object in a 2D image, comprising:
   one or more computer processors;
   one or more non-transitory computer-readable storage media;
   program instructions, stored on the one or more non-transitory computer-readable storage media, which when implemented by the one or more processors, cause the computer system to perform the steps of:
      receiving a plurality of 2D images from a visual sensor, each image of the plurality of 2D images includes an image of a target object in an surrounding environment;
      detecting features and extracting feature points from the plurality of 2D images;
      manually marking visible feature points of the target object on each image of the plurality of 2D images;
      estimating occluded feature points of the target object in at least one of the plurality of 2D images by defining axis lines starting from visible marked points;
      generating from the plurality of 2D images a 3D world coordinate system of the environment surrounding the target object;
      mapping each of the marked feature points on the plurality of 2D images to the 3D world coordinate system;
      generating a 3D map of the surrounding environment using the extracted feature points;
      automatically generating a 3D bounding box for the target object covering all the marked points mapped to the 3D world coordinate system;
      determining a ground plane of the 3D world coordinate system;
      automatically fitting, in the 3D world coordinate system, the 3D bounding box for the target object in each of the plurality of 2D images based on the visible and estimated occluded points, the axis lines and the ground plane;
mapping the 3D bounding box back to the plurality of 2D images; and
generating a label for the target object surrounded by the 3D bounding box on each of the plurality of 2D images using a machine learning object detection model and projecting the label to corresponding feature points of the target object in the 3D map of the surrounding environment.

9. The computer system of claim 8, further comprising fitting the 3D bounding box for each of the plurality of 2D images on the ground plane in the 3D world coordinate system.

10. The computer system of claim 8, further comprising marking two points in each of the plurality of 2D images that define a main axis of the target object and using the main axis when generating the 3D bounding box.

11. The computer system of claim 8, wherein defining axis lines starting from visible marked points includes defining a first line between two visible marked points, defining a second line between a visible point and an occluded point.

12. The computer system of claim 11, further including forcing the second line to be parallel to the first line.

13. The computer system of claim 8, further comprising training the machine learning object detection model based on the generated label for the target object.

14. The computer system of claim 13, wherein training the machine learning object detection model includes determining correspondence between 2D feature points in the plurality of 2D images and 3D feature points in the 3D map, determining that a set of 2D feature points in the plurality of 2D images belongs to the target object, labeling the set of 2D feature points with the corresponding object and projecting the object label of the 2D feature points to the corresponding set of 3D feature points.

15. A computer program product comprising:
program instructions on a computer-readable storage medium, where execution of the program instructions using a computer causes the computer to perform a method for detecting and labeling an object in a 2D image, comprising:
receiving a plurality of 2D images from a visual sensor, each image of the plurality of 2D images includes an image of a target object in an surrounding environment;
detecting features and extracting feature points from the plurality of 2D images;
manually marking visible feature points of the target object on each image of the plurality of 2D images;
estimating occluded feature points of the target object in at least one of the plurality of 2D images by defining axis lines starting from visible marked points;
generating from the plurality of 2D images a 3D world coordinate system of the environment surrounding the target object;
mapping each of the marked feature points on the plurality of 2D images to the 3D world coordinate system;
automatically generating a 3D bounding box for the target object covering all the marked points mapped to the 3D world coordinate system;
determining a ground plane of the 3D world coordinate system;
automatically fitting, in the 3D world coordinate system, the 3D bounding box for the target object in each of the plurality of 2D images based on the visible and estimated occluded points, the axis lines and the ground plane;
mapping the 3D bounding box back to the plurality of 2D images; and
generating a label for the target object surrounded by the 3D bounding box on each of the plurality of 2D images using a machine learning object detection model and projecting the label to corresponding feature points of the target object in the 3D map of the surrounding environment.

16. The computer program product of claim 15, further comprising fitting the 3D bounding box for each of the plurality of 2D images on the ground plane in the 3D world coordinate system.

17. The computer program product of claim 15, further comprising marking two points in each of the plurality of 2D images that define a main axis of the target object and using the main axis when generating the 3D bounding box.

18. The computer program product of claim 15, wherein defining axis lines starting from visible marked points includes defining a first line between two visible marked points, defining a second line between a visible point and an occluded point.

19. The computer program product of claim 18, further including forcing the second line to be parallel to the first line.

20. The computer program product of claim 15, further comprising training the machine learning object detection model based on the generated label for the target object.

21. The computer program product of claim 20, wherein training the machine learning object detection model includes determining correspondence between 2D feature points in the plurality of 2D images and 3D feature points in the 3D map, determining that a set of 2D feature points in the plurality of 2D images belongs to the target object, labeling the set of 2D feature points with the corresponding object and projecting the object label of the 2D feature points to the corresponding set of 3D feature points.

22. An augmented reality (AR) labeling tool comprising:
a processor;
a memory; and
a computer-readable storage medium having an AR application comprising:
a main controller, a simultaneous localization and mapping (SLAM) engine, an image/point processing engine and a scene orientation engine,
the AR application having program instructions where execution of the program instructions using a computer causes the computer to perform a method for detecting and labeling an object in a 2D image, comprising:
receiving a plurality of 2D images from a visual sensor, each image of the plurality of 2D images includes an image of a target object in an surrounding environment;
detecting features and extracting feature points from the plurality of 2D images;
manually marking visible feature points of the target object on each image of the plurality of 2D images;
estimating occluded feature points of the target object in at least one of the plurality of 2D images by defining axis lines starting from visible marked points;

generating from the plurality of 2D images a 3D world coordinate system of the environment surrounding the target object;

mapping each of the marked feature points on the plurality of 2D images to the 3D world coordinate system;

generating a 3D map of the surrounding environment using the extracted feature points;

automatically generating a 3D bounding box for the target object covering all the marked points mapped to the 3D world coordinate system;

determining a ground plane of the 3D world coordinate system;

automatically fitting in the 3D world coordinate system the 3D bounding box for the target object in each of the plurality of 2D images based on the visible and estimated occluded points, the axis lines and the ground plane;

mapping the 3D bounding box back to the plurality of 2D images; and generating a label for the target object surrounded by the 3D bounding box on each of the plurality of 2D images using a machine learning object detection model and projecting the label to corresponding feature points of the target object in the 3D map of the surrounding environment.

23. The AR labeling tool of claim 22, wherein the image/point processing engine includes a plane detection module, and wherein the method further comprises fitting the 3D bounding box for each of the plurality of 2D images on the ground plane in the 3D world coordinate system.

24. A computer program product comprising:

an augmented reality application having program instructions on a computer-readable storage medium, the program instructions forming a main controller, a simultaneous localization and mapping (SLAM) engine, an image/point processing engine and a scene orientation engine, where execution of the program instructions using a computer causes the computer to perform a method for detecting and labeling an object in a 2D image, comprising:

receiving a plurality of 2D images from a visual sensor, each image of the plurality of 2D images includes an image of a target object in an surrounding environment;

detecting features and extracting feature points from the plurality of 2D images;

manually marking visible feature points of the target object on each image of the plurality of 2D images;

estimating occluded feature points of the target object in at least one of the plurality of 2D images by defining axis lines starting from visible marked points;

generating from the plurality of 2D images a 3D world coordinate system of the environment surrounding the target object;

mapping each of the marked feature points on the plurality of 2D images to the 3D world coordinate system;

generating a 3D map of the surrounding environment using the extracted feature points;

automatically generating a 3D bounding box covering all the marked points mapped to the 3D world coordinate system;

determining a ground plane of the 3D world coordinate system;

automatically fitting in the 3D world coordinate system the 3D bounding box for the target object in each of the plurality of 2D images based on the visible and estimated occluded points, the axis lines and the ground plane;

mapping the 3D bounding box back to the plurality of 2D images; and generating a label for the target object surrounded by the 3D bounding box on each of the plurality of 2D images using a machine learning object detection model and projecting the label to corresponding feature points of the target object in the 3D map of the surrounding environment.

25. The computer program product of claim 24, further comprising fitting the 3D bounding box for each of the plurality of 2D images on the ground plane in the 3D world coordinate system and marking two points in each of the plurality of 2D images that define a main axis of the target object and using the main axis when generating the 3D bounding box.

* * * * *